US011328614B1

(12) United States Patent
Bart et al.

(10) Patent No.: US 11,328,614 B1
(45) Date of Patent: May 10, 2022

(54) SYSTEM AND METHOD FOR RETURNING A DRONE TO A DOCK AFTER FLIGHT

(71) Applicant: Alarm.com Incorporated, Tysons, VA (US)

(72) Inventors: Gary Franklin Bart, Weston, FL (US); Dean Constantine, Ft. Lauderdale, FL (US)

(73) Assignee: Alarm.com Incorporated, Tysons, VA (US)

( * ) Notice: Subject to any disclaimer, the term of this patent is extended or adjusted under 35 U.S.C. 154(b) by 304 days.

(21) Appl. No.: 15/942,374

(22) Filed: Mar. 30, 2018

Related U.S. Application Data

(60) Provisional application No. 62/478,881, filed on Mar. 30, 2017.

(51) Int. Cl.
| | | |
|---|---|---|
| *G08G 5/02* | (2006.01) | |
| *G08G 5/00* | (2006.01) | |
| *H04B 10/116* | (2013.01) | |
| *G05D 1/12* | (2006.01) | |
| *G05D 1/10* | (2006.01) | |
| *B64C 39/02* | (2006.01) | |

(52) U.S. Cl.
CPC ............. *G08G 5/025* (2013.01); *G05D 1/101* (2013.01); *G05D 1/12* (2013.01); *G08G 5/0069* (2013.01); *H04B 10/116* (2013.01); *B64C 39/024* (2013.01); *B64C 2201/141* (2013.01)

(58) Field of Classification Search
CPC ...... G08G 5/025; G08G 5/0069; G05D 1/101; G05D 1/12; H04B 10/116
See application file for complete search history.

(56) References Cited

U.S. PATENT DOCUMENTS

| | | | | |
|---|---|---|---|---|
| 3,648,229 | A | * | 3/1972 | Burrows ............... G01S 1/7038 340/956 |
| 9,904,283 | B2 | | 2/2018 | Liu et al. |
| 2003/0144041 | A1 | * | 7/2003 | Oettinger ........... H04B 10/1123 398/131 |
| 2012/0038903 | A1 | * | 2/2012 | Weimer ............... G01S 7/4868 356/4.07 |
| 2013/0200207 | A1 | * | 8/2013 | Pongratz ............... B64C 39/024 244/2 |
| 2014/0043436 | A1 | * | 2/2014 | Bell ..................... H04N 13/246 348/46 |

(Continued)

*Primary Examiner* — Hunter B Lonsberry
*Assistant Examiner* — Daniel L Greene
(74) *Attorney, Agent, or Firm* — Fish & Richardson P.C.

(57) ABSTRACT

Methods, systems, apparatus, including computer programs encoded on a computer storage medium, for returning a drone to a drone dock. In one aspect, a method includes detecting, by the drone and using a drone-mounted light detection unit, a first light signal and a second light signal generated by one of a plurality of visible light communication devices coupled to the drone dock, obtaining, by the drone, location information based on the first detected light signal and the second detected light signal, determining, by the drone, a position of the drone relative to the drone dock based on the obtained location information, and adjusting, by the drone, the navigation path of the drone in a manner that alters an alignment of at least a portion of the drone relative to the drone dock based on the determined position.

20 Claims, 6 Drawing Sheets

(56) References Cited

U.S. PATENT DOCUMENTS

| | | | | |
|---|---|---|---|---|
| 2015/0035437 A1* | 2/2015 | Panopoulos | ......... | H05B 47/105 |
| | | | | 315/112 |
| 2016/0041266 A1* | 2/2016 | Smits | ...................... | G01S 7/497 |
| | | | | 356/5.01 |
| 2016/0304217 A1* | 10/2016 | Fisher | ...................... | B64F 1/222 |
| 2017/0030877 A1* | 2/2017 | Miresmailli | .............. | A01G 7/00 |
| 2017/0261975 A1* | 9/2017 | Liu | ....................... | H04B 10/116 |
| 2017/0280107 A1* | 9/2017 | Wood | ..................... | G06Q 50/01 |
| 2017/0373507 A1* | 12/2017 | Amelio | ..................... | A61L 9/18 |
| 2018/0094935 A1* | 4/2018 | O'Brien | ................ | B64C 39/024 |
| 2018/0320402 A1* | 11/2018 | Evans | .................... | B61B 13/00 |

* cited by examiner

500

```
┌─────────────────────────────────────────────────┐
│ DETECT LIGHT SIGNALS GENERATED BY TWO OR MORE   │
│ VISIBLE LIGHT COMMUNICATION DEVICES COUPLED TO  │
│ A DRONE USING ONE OR MORE DOCK-MOUNTED SENSORS  │
│                                            510  │
└─────────────────────────────────────────────────┘
                         │
                         ▼
┌─────────────────────────────────────────────────┐
│      OBTAIN LOCATION INFORMATION BASED          │
│        ON THE DETECTED LIGHT SIGNALS            │
│                                            520  │
└─────────────────────────────────────────────────┘
                         │
                         ▼
┌─────────────────────────────────────────────────┐
│ DETERMINE A POSITION OF A DRONE RELATIVE TO THE │
│ DOCK BASED ON THE OBTAINED LOCATION INFORMATION │
│                                            530  │
└─────────────────────────────────────────────────┘
                         │
                         ▼
┌─────────────────────────────────────────────────┐
│ DETERMINE A PROPOSED ADJUSTMENT TO A NAVIGATION │
│ PATH OF THE DRONE BASED ON THE DETERMINED       │
│ POSITION                                   540  │
└─────────────────────────────────────────────────┘
                         │
                         ▼
┌─────────────────────────────────────────────────┐
│       GENERATING A MESSAGE THAT INCLUDES        │
│     NAVIGATION PATH ADJUSTMENT INSTRUCTIONS     │
│                                            550  │
└─────────────────────────────────────────────────┘
                         │
                         ▼
┌─────────────────────────────────────────────────┐
│           TRANSMITTING THE NAVIGATION           │
│        ADJUSTMENT MESSAGE TO THE DRONE          │
│                                            560  │
└─────────────────────────────────────────────────┘
```

FIG. 5

SYSTEM AND METHOD FOR RETURNING A DRONE TO A DOCK AFTER FLIGHT

CROSS-REFERENCE TO RELATED APPLICATIONS

This application claims the benefit of the U.S. Provisional Patent Application No. 62/478,881 filed Mar. 30, 2017 and entitled "System and Method for Returning a Drone to a Dock After Flight," which is incorporated herein by reference in its entirety.

BACKGROUND

Property monitoring systems can be armed and used to monitor sensor data generated by one or more sensors at a property in order to determine whether an event has occurred at the property.

Some property monitoring systems can employ the use of a drone as a mobile sensor unit to surveil one or more portions or the property. Alternatively, or in addition, the property monitoring systems can dispatch the drone to investigate a portion of the property in response to the detection of an event, or the like.

SUMMARY

A system and method is disclosed for enabling a drone to locate, navigate to, and couple to a target such as a dock provided by a drone docking system. The drone is configured to dynamically alter the drone's navigation path followed during the drone's return approach to the dock based on signals emitted by the dock. The signals emitted by the dock may include light signals.

Alternatively, the drone may be configured to emit signals such as light signals that are detected by a dock. The dock may calculate one or more alterations to the navigation path to be followed during the drone's return approach to the dock. The dock may transmit instructions representing the one or more navigation path alterations to the drone. The drone may receive the instructions and adjust the drone's navigation path followed during the drone's return approach to the dock based on the received instructions.

In one aspect, a method for returning a drone to a drone dock is disclosed. The method may include actions of detecting, by the drone and using a drone-mounted light detection unit, a first light signal and a second light signal generated by one of a plurality of visible light communication devices coupled to the drone dock, obtaining, by the drone, location information based on the first detected light signal and the second detected light signal, determining, by the drone, a position of the drone relative to the drone dock based on the obtained location information, and adjusting, by the drone, the navigation path of the drone in a manner that alters an alignment of at least a portion of the drone relative to the drone dock based on the determined position.

Other versions include corresponding systems, apparatus, and computer programs to perform the actions of methods, encoded on computer storage devices.

These and other versions may optionally include one or more of the following features. For instance, in some implementations, the method may further include accessing, by the drone, first data describing (i) characteristics of a first visible light communication device of the plurality of visible light communication devices, and (ii) characteristics of a second light communication device of the plurality of visible light communication devices.

In some implementations, obtaining, by the drone, the location information based on the first detected light signal and the second detected light signal may include determining, by the drone, second data that describes one or more characteristics of the first detected light signal based on the electrical signals.

In some implementations, the one or more characteristics of the first visible light communication device includes the signal strength of light signals generated by the first visible light communication device.

In some implementations, determining, by the drone, the position of the drone relative to the drone dock based on the obtained location information may include comparing, by the drone, the second data that describes one or more characteristics of the first detected light signal to at least a portion of the first data stored by the drone, and determining, based on the comparison and by the drone, that the first visible light communication device generated the first detected light signal.

In some implementations, the method may further include determining, by the drone, a current location of the drone in a three-dimensional map of the property relative to the location of the first visible light communication device that is mounted to the drone dock by determining a distance between the drone and the first visible light communication device based on the comparison of the second data to the first data, wherein adjusting, by the drone, the navigation path of the drone based on the determined position may include adjusting, by the drone, the navigation path of the drone based on the determined current location of the drone in the three-dimensional map of the property relative to the location of the first visible light communication device that is mounted to the drone dock based on the determined distance.

In some implementations, the drone-mounted light detection unit may include an array of photodiodes.

In some implementations, obtaining, by the drone, the location information based on the first detected light signal and the second detected light signal may include determining, by the drone, (i) a first angle of incidence between the first detected light signal and a first plane that is perpendicular to the drone-mounted light detection unit at a first point where the first detected light signal culminates on the drone-mounted light detection unit and (ii) a second angle of incidence between the second detected light signal and a second plane that is perpendicular to the drone-mounted light detection unit at a second point where the second detected light signal culminates on the drone-mounted light detection unit.

In some implementations, determining, by the drone, the position of the drone relative to the drone dock based on the obtained location information may include determining, by the drone, a current location of the drone in a three-dimensional map of the property relative to the drone dock based on the first angle of incidence and the second angle of incidence, wherein adjusting, by the drone, the navigation path of the drone based on the determined position may include adjusting, by the drone, the navigation path of the drone based on the determined current location of the drone in the three-dimensional map of the property relative to the drone dock based on the first angle of incidence and the second angle of incidence.

In some implementations, determining, by the drone, a current location of the drone in a three-dimensional map of the property relative to the drone dock based on the first angle of incidence and the second angle of incidence may include determining the location of the drone using temporal changes in the first angle of incidence and the second angle of incidence.

BRIEF DESCRIPTION OF THE DRAWINGS

FIG. 5 is another flowchart of an example of a process for returning a drone to a dock after flight.

DETAILED DESCRIPTION

The present disclosure is directed towards a system and method for returning a drone to a drone dock after a flight. The drone may return to the drone dock by dynamically adjusting the drone's navigation path based on light signals detected from visible light communication ("VLC") devices coupled to the drone dock. The drone dock, also referred to herein as a "dock," is a connection point where a drone may reside when not in flight. The dock may include a platform, one or more latches, one or more magnets, a platform-less arm, or a combination thereof that is capable of being removably coupled to a drone. When docked, a dock may charge the drone, allow the drone to use a drone-mounted camera as a surveillance camera, or the like.

Figure 1:
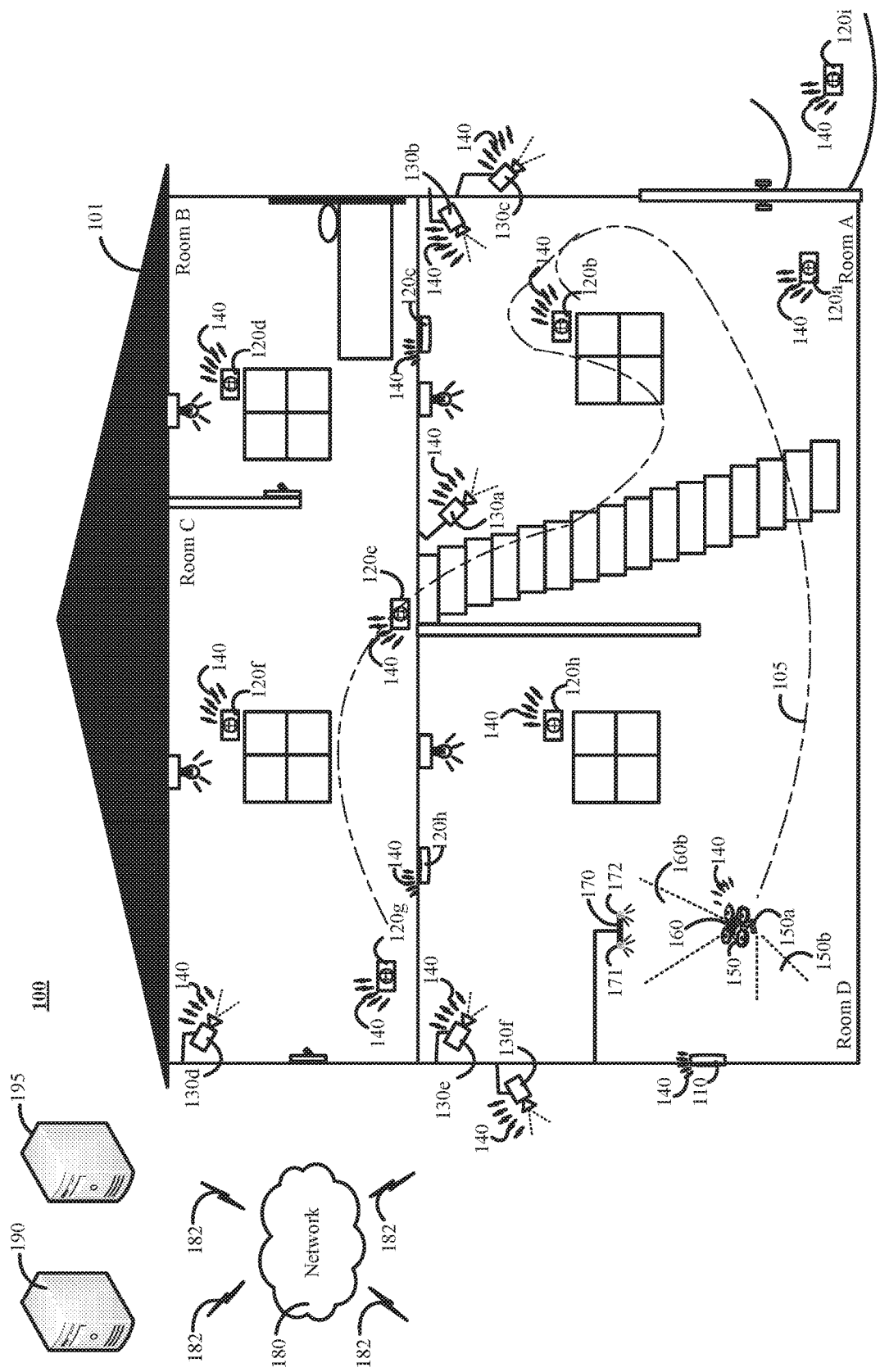
FIG. 1 is a contextual diagram of an example of a system for returning a drone to a dock after flight.

FIG. 1 is a contextual diagram of an example of a system 100 for returning a drone 150 to a dock 170 after flight. The system 100 includes at least a network 140, a drone 150, one or more drone-mounted light detection units 160, and a dock 170. Other optional components of system 100 also depicted by FIG. 1 include a monitoring system control unit 110, one or more sensors 120a, 120b, 120c, 120d, 120e, 120f, 120g, 120h, 120i, one or more cameras 130a, 130b, 130c, 130d, 130e, a network 180, a monitoring application server 190, a central alarm station server 195, or a combination thereof. The optional features depicted by FIG. 1 provide an example of a connected property 101 where the drone 150 may be employed.

A drone 150 may navigate the property 101 along a flight path 105. During navigation of the property, the drone 150 may perform one or more security operations. The security operations may include, for example, using a drone-mounted camera to capture video 150b (or images) of the property 101. The video may be routed to a monitoring application server 190 using network 140, network 180, and one or more communications links 182. The networks 140, 180 may each respectively include one or more of a LAN, a WAN, a cellular network, the Internet, Bluetooth, Z-wave, or the like. The video may be analyzed by the monitoring application server 190 for the existence of data that is indicative of a potential event such as an alarm event. If a potential event is detected, the application monitoring server 190 may notify the monitoring control unit 110, the central alarm station 195, or both via the network 180 and one or more communication links 182. The monitoring control unit 110 may transmit one or more instructions to one or more of the components of system 100 in response to the detected event. The central alarm station 195 may dispatch local authorities to the property 101.

Alternatively, or in addition, the drone 150 may navigate the property 101 for other purposes than to perform routine surveillance of the property 101. For example, the drone 150 may navigate the property 101 on a flight path 105 to manipulate manual controls such as light switches, thermostats, or the like. Alternatively, or in addition, the drone 150 may navigate the property 101 using one or more drone-mounted sensors to detect strength of Wi-Fi signals, cellular signals, or the like at various locations within the property 101.

The drone 150 returns to a room (e.g., Room D) of the property 101 that includes dock 170 along a flight path 105 upon the completion of one or more security operations. The drone 150 is equipped with a drone-mounted light detection unit 160. The drone-mounted light detection unit 160 may include a light sensitive imaging sensor, one or more photodiodes capable of translating light pulses, or a combination thereof. In some implementations, an array of photodiodes may be used. The drone 150 can use the drone-mounted light detection unit 160 to detect 160b, and obtain location information based on, light pulses output by VLC devices 171, 172 mounted to the dock 170. The obtained location information may include, for example, a relative signal strength received from each respective VLC device 171, 172, an angle of incidence (or angel of arrival) detected by the drone-mounted light detection unit 160, or the like. The drone 150 is configured to use the location information obtained based on the one or more light pulses to determine the drone's 150 location in 3D space such as Room D relative to the dock 170. The drone 150 can adjust the drone's 150 navigation path 105 during the drone's 150 return flight to the dock 170 based on the location information, the drone's 150 determined position in Room D, or a combination thereof.

For example, the drone's 150 navigation path 105 can be adjusted in a manner that alters an alignment of at least a portion of the drone relative to the dock 170. In some implementations, this may include adjusting the drone's 150 navigation path 105 so that a top of the drone 150, bottom of the drone 150, or respective side of the drone 150 are brought into better alignment with the dock 170.

In some implementations, the drone 150 can use the location information obtained based on the light pulses from VLC devices 171, 172 to adjust the drone's 150 flight path 105 during return to the dock 170 independent of video 150b captured by one or more cameras 150a that are mounted to the drone 150. Docking with the dock 170 based on the light pulses from the VLC devices 171, 172 independent of video 150b may be required in implementations where the dock 170 is configured to removably engage the drone 150 on the top of the drone 150. In such instances, the drone's camera 150a is pointing down towards the floor of Room D as the drone 150 is navigating up towards the ceiling of Room D in order to removably couple the top of the drone 150 to the dock 170. Alternatively, in other implementations, the drone 150 may use a combination of input data from multiple different sensors including the camera 150a, the drone-mounted light detection unit 160, or the like.

Figure 2:
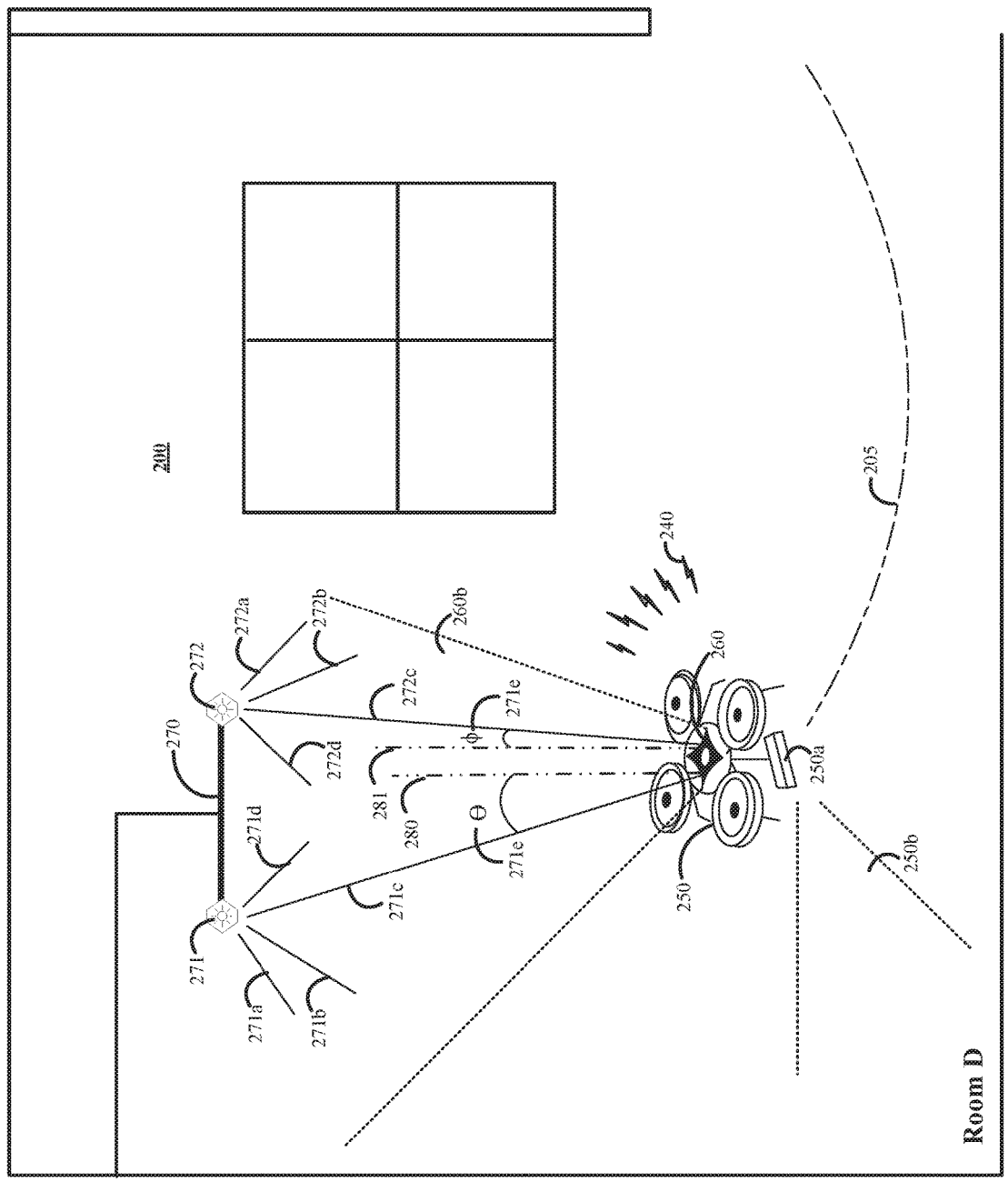
FIG. 2 is another contextual diagram of an example of a system for returning a drone to a dock after flight.

FIG. 2 is another contextual diagram of an example of a system 200 for returning a drone 250 to a dock 270 after flight.

The system 200 is substantially similar to the system 100 described above. For example, the drone 250 includes at least a drone-mounted light detection unit 260. In addition, the system 200 also includes a dock 270 and a plurality of VLC devices 271, 272.

The drone 250 can be configured to navigate to an initial point in a room of a property (e.g., Room D) that includes a dock 270. The drone 250 can begin using detected 260b light beams 271a, 271b, 271c, 271d, 272a, 272b, 272c, 272d to adjust the drone's 250 navigation path 205 for approach to the dock 270 once the initial point is reached. Alternatively, the drone 250 can begin using detected 260b light beams 271a, 271b, 271c, 271d, 272a, 272b, 272c, 272d to adjust the drone's 250 navigation path 205 once the drone-mounted light detection unit 260 begins detecting light signals 271a, 271b, 271c, 271d, 272a, 272b, 272c, 272d. In some implementations, the drone 250 can navigate from the initial point to the docking position on the dock 270 using location information determined based on the detected light pulses and independent of any video 150b captured by one or more cameras 250a mounted to the drone 250.

Location information may be obtained based on the detected light pulses in a variety of different ways. For example, the drone 250 may use the drone-mounted light detection unit 260 to determine a relative signal strength of light beams from one or more VLC devices 271, 272. In such implementations, the drone 250 may be initialized to store information associated with each respective VLC device 271, 272. Information associated with each respective VLC device 271, 272 may include one or more of a VLC device's power, light beam pattern, VLC device identifier, or the like. The drone 250 can then compare characteristics of one or more detected light beam from each respective VLC device 271 or 272 with the stored VLC device characteristics for the VLC device that output the light beam. The drone 250 can determine the drone's location in a three-dimensional map of Room D relative to the dock 270 based on the comparison of the detected light beams and the stored VLC device characteristics. Determining the drone's location in a three-dimensional map may include, for example, determining the drone's 250 distance from each respective VLC device 271, 272 based on the comparisons. The drone 250 can adjust the drone's 270 navigation path 205 based on the drone's 250 determined position.

Alternatively, or in addition, the drone 250 location information may include information related to the angle of incidence (or angle of arrival) θ, ϕ using light beams from two or more VLC devices 271, 272 that are spaced a predetermined distance apart. The angle of incidence θ, ϕ is the angle between the light beam and a plane that intersects the drone-mounted light detection unit at the point where the beam culminates on the drone-mounted light detection unit. For example, in some implementations, the angle of incidence θ, ϕ is the angle between the light beam (e.g., light beam 271c or 272c) and a plane (e.g., 280 or 281, respectively) that is perpendicular to (or near perpendicular to) the drone-mounted light detection unit 260 at a point where the beam culminates on the drone-mounted light detection unit 260. However, other planes at other angles that intersect the drone-mounted light detection unit 260 at the point where the light beams 271c, 272c culminate on the drone-mounted light detection unit 260 may be chosen to serve as respective reference planes for calculating the respective angle of incidences.

The drone 250 can determine the drone's location in a three-dimensional map of Room D relative to the dock 270 based on the angle of incidence θ, ϕ. Determining the drone's location in a three-dimensional map may include, for example, using triangulation, using temporal changes in the angle of incidence θ, ϕ, or both. The drone 250 can adjust the drone's 250 navigation path 205 based on the drone's 250 determined position.

Though use of relative light beam strength and angle of incidence to determine a drone's 250 location in a three-dimensional space were described separately, the present disclosure need not be so limited. For example, in some implementations, the drone 250 can determine the drone's 250 location in a three-dimensional map of Room D relative to the dock 270 based on a relative signal strength of detected light beams and the angle of incidence θ, ϕ.

Figure 3:
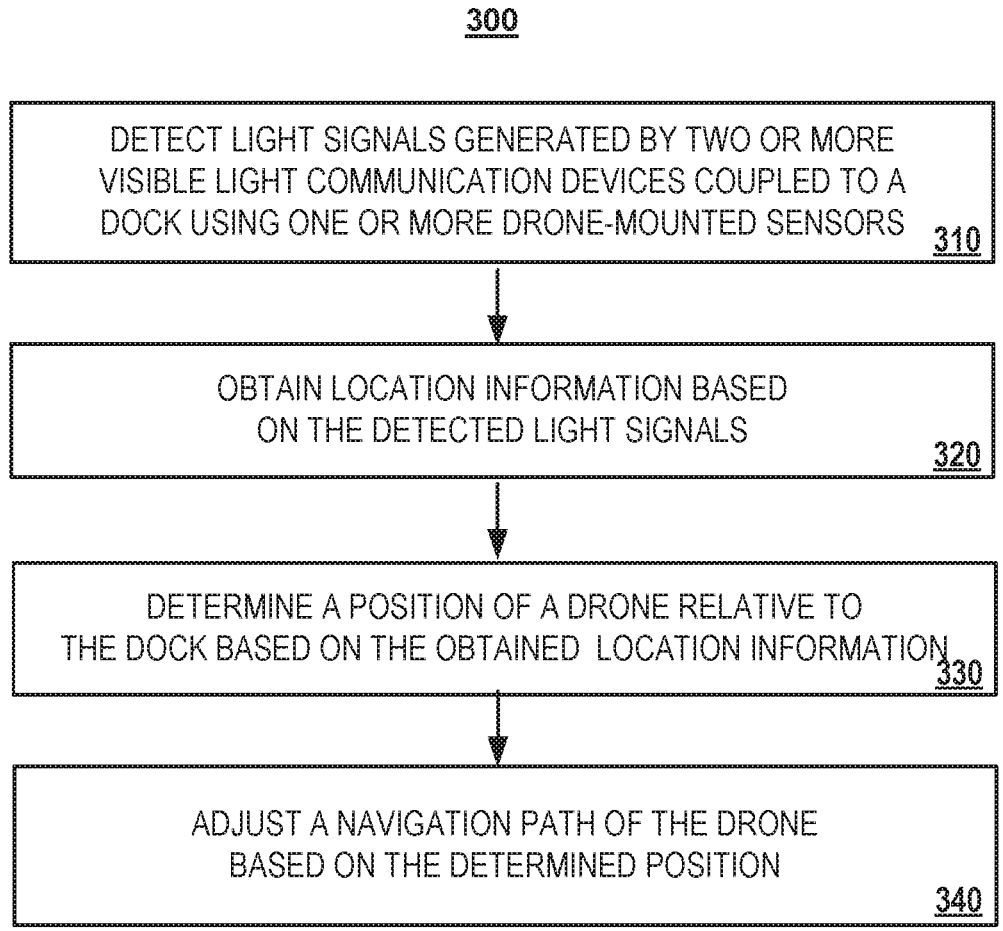
FIG. 3 is a flowchart of an example of a process for returning a drone to a dock after flight.

FIG. 3 is a flowchart of an example of a process 300 for returning a drone to a dock after flight. Generally, the process 300 includes detecting light signals generated by two or more VLC devices coupled to a dock using one or more drone-mounted sensors (310), obtaining location information based on the detected light signals (320), determining a position of a drone relative to the dock based on the obtained location information (330), and adjusting a navigation path of the drone based on the determined position (340).

In more detail, a drone can detect 310 light signals generated by two or more VLC devices coupled to a dock using one or more drone-mounted sensors. The drone mounted sensors may include light sensitive imaging sensors, one or more photodiodes capable of translating light pulses from a VLC device, or the like. In some implementations, an array of photodiodes may be used.

The drone can obtain 320 location information based on the detected light signals. Obtaining location information based on the detected light signals may include, for example, translating light beams (or pulses) from a VLC device to electrical signals such as digital signals. The obtained location information may include a relative strength of a light beam, an angel of incidence, or the like.

The drone can determine 330 its position relative to the dock based on the obtained location information. For example, the drone can determine the distance that the drone is from a VLC device based on the relative strength of the light beams received from the VLC device. This may include comparing the characteristics of a received light beam such as power, beam pattern, a VLC device identifier or the like to VLC device characteristics stored by the drone. Based on the comparison, the drone can determine which VLC device output the light beam and the distance between the drone and the VLC device. The drone can use the determined distance between the drone and the VLC device to determine the drone's location in a three-dimensional map of at least a portion of a property.

Alternatively, or in addition, the drone can determine the angle of incidence (or angle of arrival) based on the light beams from two or more VLC devices that are spaced a predetermined distance apart. The angle of incidence is the angle between a light beam and a plane that intersects the drone-mounted light detection unit at the point where the beam culminates on the drone-mounted light detection unit. For example, in some implementations, the angle of incidence θ, ϕ is the angle between the light beam and a plane that is perpendicular to (or near perpendicular to) the drone-mounted light detection unit at a point where the beam culminates on the drone-mounted light detection unit 260. The drone can determine the drone's location relative to the dock based on the angle of incidence. Determining the drone's location in a three-dimensional map may include, for example, using triangulation, using temporal changes in the angle of incidence, or both.

The drone can adjust 340 the drone's navigation path based on the determined position. For example, the drone can move a predetermined distance along any one or more axis of a coordinate system established by a three-dimensional map of a portion of a property. The three-dimensional map includes, for example, an x-axis, a y-axis, and a z-axis.

Figure 4:
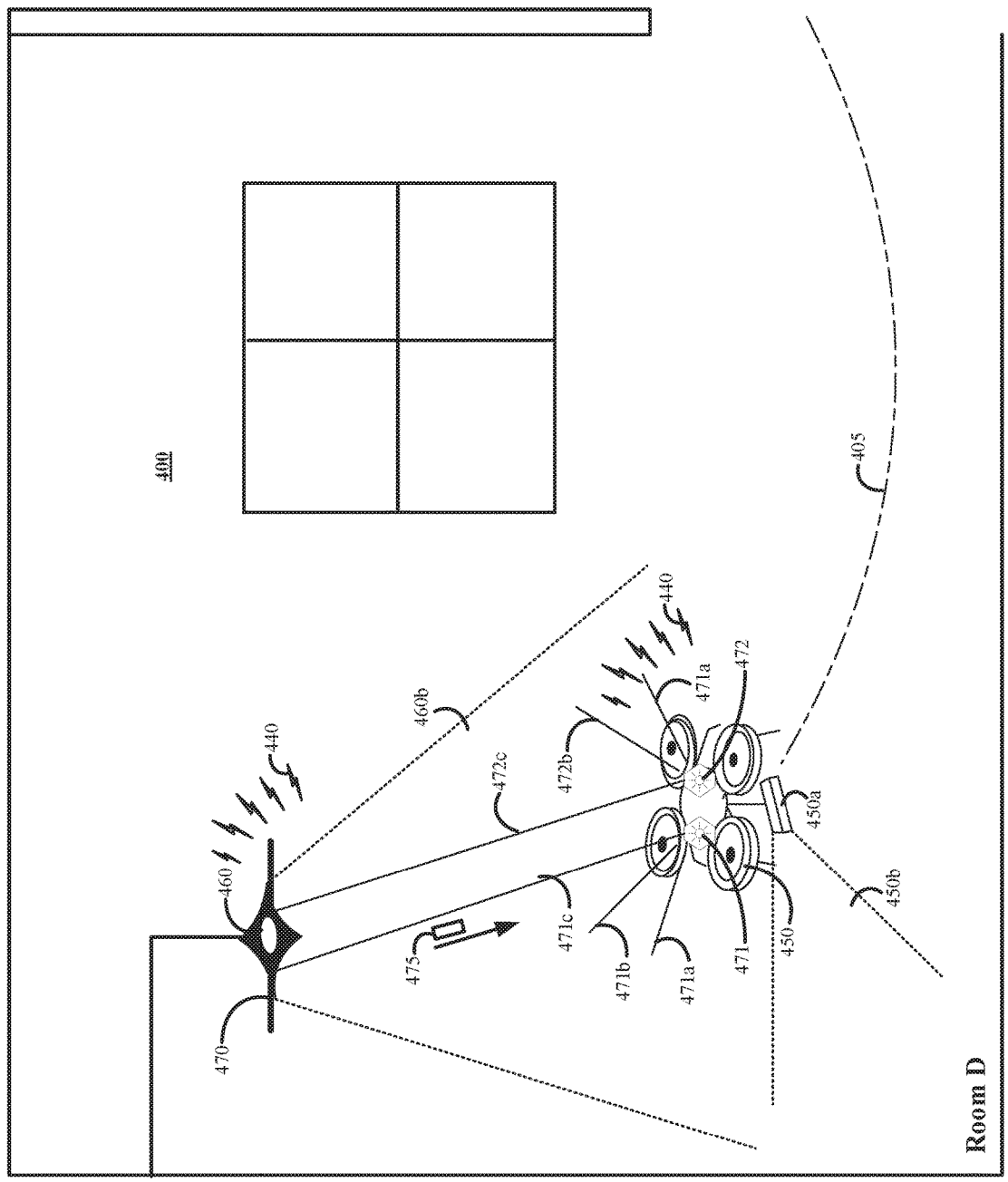
FIG. 4 is another contextual diagram of an example of a system for returning a drone to a dock after flight.

FIG. 4 is another contextual diagram of an example of a system 400 for returning a drone 450 to a dock 470 after flight.

The system 400 is similar to the system of 200 and 100 described above. However, the system 400 provides an example of a system for returning a drone 450 back to the dock 470 that includes a drone 450 that is equipped with one or more VLC devices 471, 472 and a dock 470 that includes a dock-mounted light detection unit 460. The dock-mounted light detection unit 460 may include a light sensitive imaging sensor, one or more photodiodes capable of translating light pulses, or a combination thereof. In some implementations, an array of photodiodes may be used.

The drone 450 can be configured to navigate to an initial point in a room of a property (e.g., Room D) that includes a dock 470. The dock 470 can begin using detected 260*b* light beams 471*a*, 471*b*, 471*c*, 472*a*, 472*b*, 472*c* to determine an adjustment to the drone's 450 navigation path 405 for approach to the dock 470 once the drone 450 reaches the initial point. Alternatively, the dock 470 can begin using detected 260*b* light beams 471*a*, 471*b*, 471*c*, 472*a*, 472*b*, 472*c* to determine adjustments to the drone's 450 navigation path 405 once the dock-mounted light detection unit 460 begins detecting light signals 471*a*, 471*b*, 471*c*, 472*a*, 472*b*, 472*c*. In some implementations, the drone 450 can navigate from the initial point to the dock 470 based navigation instructions received from the dock 470 via the network 440. The navigation instructions may be generated by the dock 470 using location information determined based on the detected light beams 471*a*, 471*b*, 471*c*, 472*a*, 472*b*, 472*c* and independent of any video 450*b* captured by one or more cameras 450*a* mounted to the drone 450.

The dock-mounted light detection unit 460 can obtain location information based on the detected light beams the same manner as the drone-mounted light detection unit 260. For example, the dock 470 may use the dock-mounted light detection unit 460 to determine a relative signal strength of light beams from one or more VLC devices 471, 472. In such implementations, the dock 470 may be initialized to store information associated with each respective VLC device 471, 472. Information associated with each respective VLC device 471, 472 may include one or more of a VLC device's power, light beam pattern, VLC device identifier, or the like. The dock 470 can then compare characteristics of one or more detected light beams from each respective VLC device 471 or 472 with the stored VLC device characteristics for the VLC device that output the light beam. The dock 470 can determine the drone's location in a three-dimensional map of Room D relative to the dock 470 based on the comparison of the detected light beam and the stored VLC device characteristics. Determining the drone's location in a three-dimensional map may include, for example, determining the dock's distance from each respective VLC device 471, 472 based on the comparisons. The dock 470 can generate navigation instructions 475 that include one or more adjustments that can be made to the drone's 450 navigation path to guide the drone 450 to the dock 470. The dock 470 can transmit the navigation instructions 475 to the drone 460 via a network 440. The drone 450 can receive the navigation instructions 475 and adjust the drone's 450 navigation path 405 based on the drone's 450 determined position.

Alternatively, or in addition, the drone 450 location information may include information related to the angle of incidence (or angle of arrival) using light beams from two or more VLC devices 271, 272 that are spaced a predetermined distance apart. The angle of incidence is the angle between a light beam and a plane that intersects the drone-mounted light detection unit at the point where the light beam culminates on the drone-mounted light detection unit. For example, in some implementations, the angle of incidence is the angle between the light beam and a plane that is perpendicular to (or near perpendicular to) the drone-mounted light detection unit at a point where the beam culminates on the drone-mounted light detection unit. The dock 470 can determine the drone's 450 location in a three-dimensional map of Room D relative to the dock 470 based on the angle of incidence associated with each respective light beam. Determining the drone's location in a three-dimensional map may include, for example, using triangulation, using temporal changes in the angle of incidence for each respective light beam, or both. The dock 470 can generate navigation instructions 475 that include one or more adjustments that can be made to the drone's navigation path to guide the drone 450 to the dock 470. The dock 470 can transmit the navigation instructions to the drone 450 via a network 440. The drone 450 can receive the navigation instructions 475 and adjust the drone's 450 navigation path 405 based on the drone's 450 determined position.

Though use of relative light beam strength and angle of incidence by a dock 470 to determine a drone's 450 location in a three-dimensional space were described separately, the present disclosure need not be so limited. For example, in some implementations, the dock 470 can determine the drone's 450 location in a three-dimensional map of Room D relative to the dock 470 based on a relative signal strength of detected light beams and the angle of incidence.

FIG. 5 is another flowchart of an example of a process 500 for returning a drone to a dock after flight. Generally, the process 500 includes detecting light signals generated by two or more VLC devices coupled to a drone using one or more dock-mounted sensors (510), obtaining location information based on the detected light signals (520), determining a position of a drone relative to the dock based on the location information (530), determining a proposed adjustment to a navigation path of the drone based on the determined position (540), generating a message that includes navigation path adjustment instructions (550), and transmitting a message to the drone with instructions to adjust the navigation path of the drone (560).

In more detail, the dock can detect 510 light signals generated by two or more drone-mounted VLC devices using one or more dock-mounted sensors. The dock-mounted sensors may include may include a light sensitive imaging sensor, one or more photodiodes capable of translating light pulses, or a combination thereof. In some implementations, an array of photodiodes capable of translating light pulses may be used.

The dock can obtain 520 location information based on the detected light signals. Obtaining location information based on the detected light signals may include, for example, translating light beams (or pulses) from a drone-mounted-VLC device to electrical signals such as digital signals. The obtained location information may include a relative strength of a light beam, an angel of incidence, or the like.

The dock can determine 530 a position of a drone relative to the dock based on the obtained location information. For example, the dock can determine the distance that each respective drone-mounted VLC device is from the dock based on the relative strength of the light beams received from the drone-mounted VLC device. This may include comparing the characteristics of a received light beam such as power, beam pattern, a drone-mounted VLC device identifier or the like to drone-mounted VLC device characteristics stored by the dock. Based on the comparison, the dock can determine which drone-mounted VLC device output the light beam and the distance between the dock and the drone-mounted VLC device. The dock can determine the drone's location in a three-dimensional map relative to the dock based on the comparison of the detected light beam and the stored drone-mounted VLC device characteristics. Determining the drone's location in a three-dimensional map may include, for example, determining the dock's distance from each respective drone-mounted VLC device based on the comparison.

Alternatively, or in addition, the dock can determine the angle of incidence (or angle of arrival) based on the light beams from two or more drone-mounted VLC devices that are spaced a predetermined distance apart. The angle of incidence is the angle between the light beam and a plane that intersects the drone-mounted light detection unit at a point where the beam culminates on the drone-mounted light detection unit. For example, in some implementations, the angle of incidence is the angle between the light beam and the plane that is perpendicular to (or near perpendicular to) the drone-mounted light detection unit at a point where the beam culminates on the drone-mounted light detection unit. The dock can determine the drone's location relative to the dock based on the angle of incidence. The dock can determine the drone's location in a three-dimensional map by, for example, using triangulation, using temporal changes in the angle of incidence, or both.

The dock can determine 540 an adjustment to the drone's return navigation path of the drone based on the determined position. For example, the dock may determine that the drone's flight path should be adjusted a predetermined amount along one or more axis of a three dimensional coordinate system used by a three-dimensional map. The one or more axis of the three-dimensional system may include an x-axis, a y-axis, and a z-axis. The dock can generate 550 a message that includes navigation instructions. The navigation instructions may include one or more adjustments that can be made to the drone's navigation path to guide the drone to the dock. The dock can transmit 560 the navigation instructions to the drone via a network. The drone can receive the navigation instructions and adjust the drone's navigation path based on the received instructions.

Figure 6:
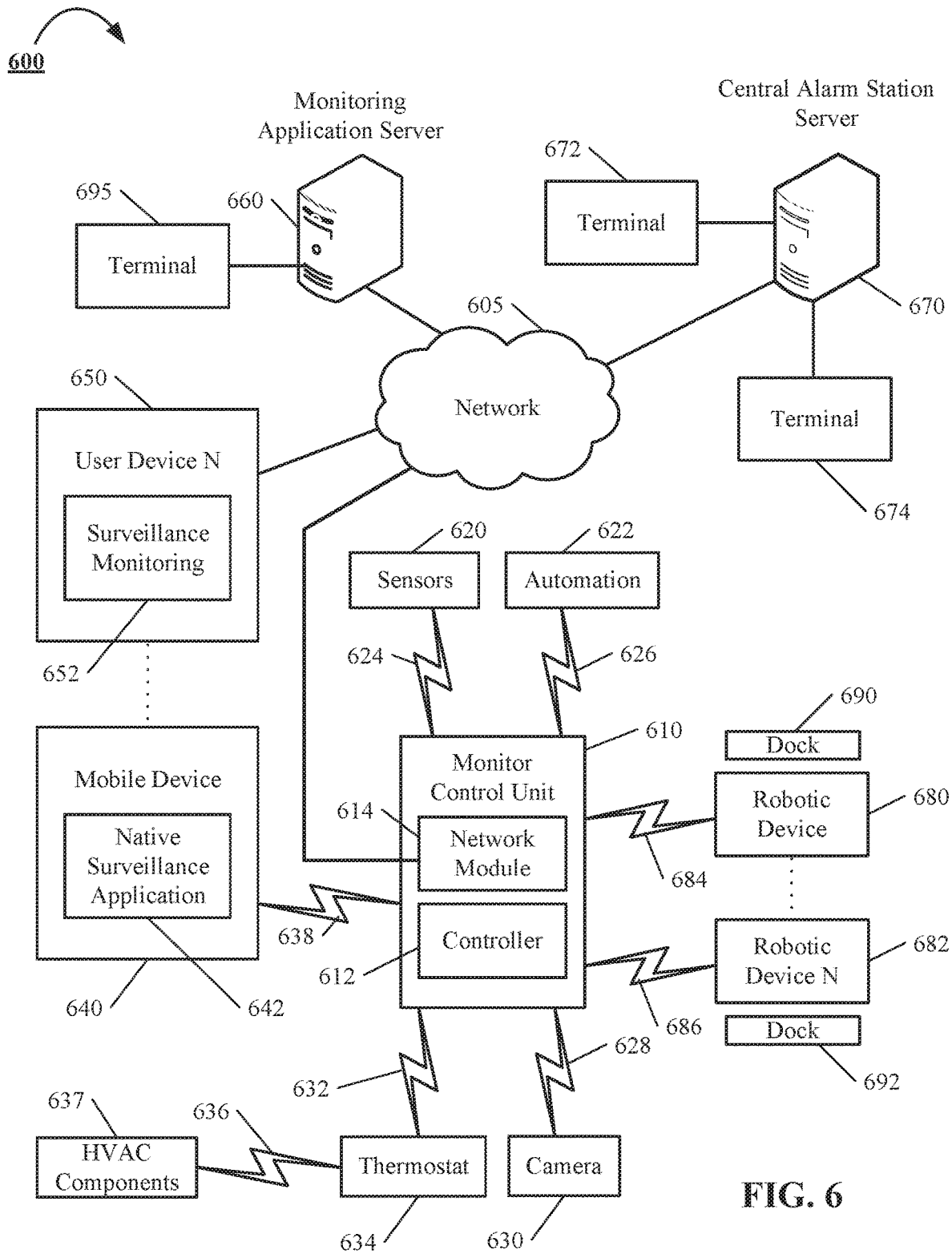
FIG. 6 is a block diagram of components of a system for returning a drone to a dock after flight.

FIG. 6 is a block diagram of components of a system for returning a drone to a dock after flight.

The electronic system 600 includes a network 605, a monitoring system control unit 610, one or more user devices 640, 650, a monitoring application server 660, and a central alarm station server 670. In some examples, the network 605 facilitates communications between the monitoring system control unit 610, the one or more user devices 640, 650, the monitoring application server 660, and the central alarm station server 670.

The network 605 is configured to enable exchange of electronic communications between devices connected to the network 605. For example, the network 605 may be configured to enable exchange of electronic communications between the monitoring system control unit 610, the one or more user devices 640, 650, the monitoring application server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The monitoring system control unit 610 includes a controller 612 and a network module 614. The controller 612 is configured to control a monitoring system (e.g., a home alarm or security system) that includes the monitoring system control unit 610. In some examples, the controller 612 may include a processor or other control circuitry configured to execute instructions of a program that controls operation of an alarm system. In these examples, the controller 612 may be configured to receive input from sensors, detectors, or other devices included in the alarm system and control operations of devices included in the alarm system or other household devices (e.g., a thermostat, an appliance, lights, etc.). For example, the controller 612 may be configured to control operation of the network module 614 included in the monitoring system control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the monitoring system control unit 610 to communicate over a local area network and/or the Internet. The network module 614 also may be a voiceband modem configured to enable the alarm panel to communicate over the telephone lines of Plain Old Telephone Systems (POTS).

The monitoring system that includes the monitoring system control unit 610 includes one or more sensors or detectors. For example, the monitoring system may include multiple sensors 620. The sensors 620 may include a contact sensor, a motion sensor, a glass break sensor, or any other type of sensor included in an alarm system or security system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 may include a radio-frequency identification (RFID) sensor that identifies a particular article that includes a pre-assigned RFID tag.

The monitoring system control unit 610 communicates with the module 622 and the camera 630 to perform surveillance or monitoring. The module 622 is connected to one or more devices that enable home automation control. For instance, the module 622 may be connected to one or more lighting systems and may be configured to control operation of the one or more lighting systems. Also, the module 622 may be connected to one or more electronic locks at the property and may be configured to control operation of the one or more electronic locks (e.g., control Z-Wave locks using wireless communications in the Z-Wave protocol. Further, the module 622 may be connected to one or more appliances at the property and may be configured to control operation of the one or more appliances. The module 622 may include multiple modules that are each specific to the type of device being controlled in an automated manner. The module 622 may control the one or more devices based on commands received from the monitoring system control unit 610. For instance, the module 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building monitored by the monitoring system control unit 610. The camera 630 may be configured to capture single, static images of the area and also video images of the area in which multiple images of the area are captured at a relatively high frequency (e.g., thirty images per second). The camera 630 may be controlled based on commands received from the monitoring system control unit 610.

The camera 630 may be triggered by several different types of techniques. For instance, a Passive Infra Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra Red, Z-wave controlled "white" lights, lights controlled by the module 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the monitoring system control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 660 over the Internet. In these implementations, image data captured by the camera 630 does not pass through the monitoring system control unit 610 and the camera 630 receives commands related to operation from the monitoring application server 660.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the monitoring system control unit 610 and can control the environmental (e.g., temperature) settings based on commands received from the monitoring system control unit 610.

In some implementations, the thermostat 634 is a dynamically programmable thermostat and can be integrated with the monitoring system control unit 610. For example, the dynamically programmable thermostat 634 can include the monitoring system control unit 610, e.g., as an internal component to the dynamically programmable thermostat 634. In addition, the monitoring system control unit 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

The system 600 further includes one or more robotic devices 680 and 682. The robotic devices 680 and 682 may be any type of robots that are capable of moving and taking actions that assist in security monitoring. For example, the robotic devices 680 and 682 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 680 and 682 may be robotic devices that are intended for other purposes and merely associated with the monitoring system 600 for use in appropriate circumstances. For instance, a robotic vacuum cleaner device may be associated with the monitoring system 600 as one of the robotic devices 680 and 682 and may be controlled to take action responsive to monitoring system events.

In some examples, the robotic devices 680 and 682 automatically navigate within a property. In these examples, the robotic devices 680 and 682 include sensors and control processors that guide movement of the robotic devices 680 and 682 within the property. For instance, the robotic devices 680 and 682 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 680 and 682 may include control processors that process output from the various sensors and control the robotic devices 680 and 682 to move along a path that reaches the desired destination and avoids obstacles. In this regard, the control processors detect walls or other obstacles in the property and guide movement of the robotic devices 680 and 682 in a manner that avoids the walls and other obstacles.

In addition, the robotic devices 680 and 682 may store data that describes attributes of the property. For instance, the robotic devices 680 and 682 may store a floorplan and/or a three-dimensional model of the property that can be used as a map to enable the robotic devices 680 and 682 to navigate the property. During initial configuration, the robotic devices 680 and 682 may receive the data describing attributes of the property, determine a frame of reference to the data (e.g., a home or reference location in the property), and navigate the property based on the frame of reference and the data describing attributes of the property. Further, initial configuration of the robotic devices 680 and 682 also may include learning of one or more navigation patterns in which a user provides input to control the robotic devices 680 and 682 to perform a specific navigation action (e.g., fly to an upstairs bedroom and spin around while capturing video and then return to a home charging base). In this regard, the robotic devices 680 and 682 may learn and store the navigation patterns such that the robotic devices 680 and 682 may automatically repeat the specific navigation actions upon a later request.

The robotic devices 680 and 682 also may include a communication module that enables the robotic devices 680 and 682 to communicate with the monitoring system control unit 610, each other, and/or other devices. The communication module may be a wireless communication module that allows the robotic devices 680 and 682 to communicate wirelessly. For instance, the communication module may be a Wi-Fi module that enables the robotic devices 680 and 682 to communicate over a local wireless network at the property. The communication module further may be a 900 MHz wireless communication module that enables the robotic devices 680 and 682 to communicate directly with the monitoring system control unit 610. Other types of short-range wireless communication protocols, such as Bluetooth, Bluetooth LE, Zwave, Zigbee, etc., may be used to allow the robotic devices 680 and 682 to communicate with other devices in the property.

The robotic devices 680 and 682 further may include processor and storage capabilities. The robotic devices 680 and 682 may include any suitable processing devices that enable the robotic devices 680 and 682 to operate applications and perform the actions described throughout this disclosure. In addition, the robotic devices 680 and 682 may include solid state electronic storage that enables the robotic devices 680 and 682 to store a manual control map of the property and one or more machine learning models. Alternatively, or in addition, the robotic devices 680 solid state electronic storage may include applications, configuration data, collected sensor data, collected video data, collected image data, and/or any other type of information available to the robotic devices 680 and 682.

The robotic devices 680 and 682 are associated with one or more docking stations 690 and 692. The docking stations 690 and 692 may be located at a predefined home base, one or more reference locations in the property, or both. The robotic devices 680 and 682 may be configured to navigate to the docking stations 690 and 692 after completion of tasks needed to be performed for the monitoring system 600. For instance, after completion of a task such as performing routine surveillance of a property, a robotic device such as robotic devices 680 or 682 may be configured to automatically navigate to a room of property that include one of the docking stations 690 and 692 and dock with the docking station 690 or 692. Docking with a docking station 690 or 692 may include establishing a removable coupling between a robotic device 680 or 682 and a docking station 690 or 692. The removable coupling may include a physical connection using one or more mechanisms to removably couple to the robotic device 680 or 682 to the docking station 690 or 692 such as a deployable arm, a latching mechanism, a magnet, or the like. The docking stations 690 or 692 may be configured to charge the robotic device 680 or 682 while the robotic device 680 or 682 is removably coupled to the docking station 690 or 692. In this regard, the robotic devices 680 and 682 may automatically maintain a fully charged battery in a state in which the robotic devices 680 and 682 are ready for use by the monitoring system 600.

The docking stations 690 and 692 may facilitate contact based battery charging and/or wireless based battery charging. For contact based battery charging, the robotic devices 680 and 682 may have readily accessible points of contact that the robotic devices 680 and 682 are capable of positioning and mating with a corresponding contact on the docking station 690 or 692. For instance, a helicopter type robotic device may have an electronic contact on a portion of its landing gear that rests on and mates with an electronic pad of a docking station 690 or 692 when the helicopter type robotic device lands on the docking station. The electronic contact on the robotic device may include a cover that opens to expose the electronic contact when the robotic device 680 or 682 is charging and closes to cover and insulate the electronic contact when the robotic device 680 or 682 is in operation.

For docking stations that charge wirelessly, the robotic devices 680 and 682 may charge through a wireless exchange of power. In these cases, the robotic devices 680 and 682 need only locate themselves closely enough to the docking station that charges wirelessly for the wireless exchange of power to occur. In this regard, the positioning needed to land at a predefined home base or reference location in the property may be less precise than with a docking station that charges based on contact. Based on the robotic devices 680 and 682 landing at a docking station that charges wirelessly, the docking station outputs a wireless signal that the robotic devices 680 and 682 receive and convert to a power signal that charges a battery maintained on the robotic devices 680 and 682.

In some implementations, each of the robotic devices 680 and 682 has a corresponding and assigned docking station 690 and 692 such that the number of robotic devices 680 and 682 equals the number of docking stations 690 and 692. In these implementations, the robotic devices 680 and 682 always navigate to the specific docking station assigned to that robotic device. For instance, the robotic device 680 may always use docking station 690 and the robotic device 682 may always use docking station 692.

In some examples, the robotic devices 680 and 682 may share docking stations. For instance, the robotic devices 680 and 682 may use one or more community docking stations that are capable of docking multiple robotic devices 680 and 682. The community docking station may be configured to charge multiple robotic devices 680 and 682 in parallel. For example, one robotic device 680 may be removably coupled to the docking station 690 or 692 and another robotic device 682 may navigate around the same docking station and charge wirelessly. The community docking station may be configured to charge multiple robotic devices 680 and 682 in serial such that the multiple robotic devices 680 and 682 take turns charging and, when fully charged, return to a predefined home base or reference location in the property that is not associated with a charger. The number of community docking stations may be less than the number of robotic devices 680 and 682.

Also, the docking stations 690 and 692 may not be assigned to specific robotic devices 680 and 682 and may be capable of charging any of the robotic devices 680 and 682. In this regard, the robotic devices 680 and 682 may use any suitable, unoccupied docking station when not in use. For instance, when one of the robotic devices 680 and 682 has completed an operation or is in need of battery charging, the monitoring system control unit 610 references a stored table of the occupancy status of each docking station and instructs the robotic device to navigate to the nearest docking station that is unoccupied.

The docking stations 690 and 692 may further include processor and storage capabilities. The docking stations 690 and 692 may include any suitable processing devices that enable the docking stations 690 and 692 to operate applications and perform the actions described throughout this disclosure. In addition, the docking stations 690 and 692 may include solid state electronic storage that enables the docking stations 690 and 692 to store information related to one or more VLC devices.

In some implementations, each respective docking station 690 and 692 may include one or more visible light communication (VLC) devices. The VLC devices may include a light that outputs light beams in the visible spectrum. The light may include a fluorescent lamp, an LED lamp, or the like. The light beam can be detected using a robotic-device-mounted light detection unit. The robotic-device-mounted light detection unit can obtain location information from the detected light beams and adjust the drone's navigation path towards a docking station based on the obtained location information. The robotic-device-mounted light detection unit may include a light sensitive imaging sensor, one or more photodiodes capable of translating light pulses, or a combination thereof. In some implementations, an array of photodiodes may be used.

Alternatively, or in addition, some implementations may include robotic devices 680 or 682 that include one or more robotic-device-mounted VLC devices. In such instances, the docking stations 690 and 692 may be configured with a docking-station-mounted light detection unit. The docking-station-mounted light detection unit may include a light sensitive imaging sensor, one or more photodiodes capable of translating light pulses, or a combination thereof. In some implementations, an array of photodiodes may be used. The docking station 690 or 692 can determine when a robotic device 680 or 682 is on a flight path that approaches the docking station to dock. The docking station 690 or 692 may detect one or more light beams from the robotic-device-mounted VLC devices, translate the one or more light beams to electrical signals such as digital signals, and determine the relative location of the robotic device 680 or 682 that is on a flight path approaching the docking station to dock. The docking station 690 or 692 may generate a navigation path adjustment message and transmit the navigation path adjustment message to a robotic device that is on a flight path approaching the docking station to dock. The robotic device 680 or 682 can update the robotic device's navigation path towards the docking station 690 or 692 based on the received navigation path adjustment message.

The sensors 620, the module 622, the camera 630, the thermostat 634, and the robotic devices 680 and 682 communicate with the controller 612 over communication links 624, 626, 628, 632, 684, and 686. The communication links 624, 626, 628, 632, 684, and 686 may be a wired or wireless data pathway configured to transmit signals from the sensors 620, the module 622, the camera 630, the thermostat 634, and the robotic devices 680 and 682 to the controller 612. The sensors 620, the module 622, the camera 630, the thermostat 634, and the robotic devices 680 and 682 may continuously transmit sensed values to the controller 612, periodically transmit sensed values to the controller 612, or transmit sensed values to the controller 612 in response to a change in a sensed value.

The communication links 624, 626, 628, 632, 684, and 686 may include a local network. The sensors 620, the module 622, the camera 630, the thermostat 634, and the robotic devices 680 and 682 and the controller 612 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 6 (CAT5) or Category 6 (CAT6) wired Ethernet network. The local network may be a mesh network constructed based on the devices connected to the mesh network.

The monitoring application server 660 is an electronic device configured to provide monitoring services by exchanging electronic communications with the monitoring system control unit 610, the one or more user devices 640, 650, and the central alarm station server 670 over the network 605. For example, the monitoring application server 660 may be configured to monitor events (e.g., alarm events) generated by the monitoring system control unit 610. In this example, the monitoring application server 660 may exchange electronic communications with the network module 614 included in the monitoring system control unit 610 to receive information regarding events (e.g., alarm events) detected by the monitoring system control unit 610. The monitoring application server 660 also may receive information regarding events (e.g., alarm events) from the one or more user devices 640, 650.

In some examples, the monitoring application server 660 may route alarm data received from the network module 614 or the one or more user devices 640, 650 to the central alarm station server 670. For example, the monitoring application server 660 may transmit the alarm data to the central alarm station server 670 over the network 605.

The central alarm station server 670 is an electronic device configured to provide alarm monitoring service by exchanging communications with the monitoring system control unit 610, the one or more robotic devices 680 and 682, the one or more mobile devices 640, 650, and the monitoring application server 660 over the network 605. For example, the central alarm station server 670 may be configured to monitor alarm events generated by the monitoring system control unit 610. In this example, the central alarm station server 670 may exchange communications with the network module 614 included in the monitoring system control unit 610 to receive information regarding alarm events detected by the monitoring system control unit 610. The central alarm station server 670 also may receive information regarding alarm events from the one or more mobile devices 640, 650, one or more robotic devices 680 and 682, and/or the monitoring application server 660.

The central alarm station server 670 is connected to multiple terminals 672 and 674. The terminals 672 and 674 may be used by operators to process alarm events. For example, the central alarm station server 670 may route alarm data to the terminals 672 and 674 to enable an operator to process the alarm data. The terminals 672 and 674 may include general-purpose computers (e.g., desktop personal computers, workstations, or laptop computers) that are configured to receive alarm data from a server in the central alarm station server 670 and render a display of information based on the alarm data. For instance, the controller 612 may control the network module 614 to transmit, to the central alarm station server 670, alarm data indicating that a sensor 620 detected a door opening when the monitoring system was armed. The central alarm station server 670 may receive the alarm data and route the alarm data to the terminal 672 for processing by an operator associated with the terminal 672. The terminal 672 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640, 650 are devices that host and display user interfaces. For instance, the user device 640 is a mobile device that hosts one or more native applications (e.g., the native surveillance application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a native surveillance application 642. The native surveillance application 642 refers to a software/firmware program running on the corresponding mobile device that enables the user interface and features described throughout. The user device 640 may load or install the native surveillance application 642 based on data received over a network or data received from local media. The native surveillance application 642 runs on mobile devices platforms, such as iPhone, iPod touch, Blackberry, Google Android, Windows Mobile, etc. The native surveillance application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 660 and/or the monitoring system control unit 610 over the network 605. The user device 650 may be configured to display a surveillance monitoring user interface 652 that is generated by the user device 650 or generated by the monitoring application server 660. For example, the user device 650 may be configured to display a user interface (e.g., a web page) provided by the monitoring application server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640, 650 communicate with and receive monitoring system data from the monitoring system control unit 610 using the communication link 638. For instance, the one or more user devices 640, 650 may communicate with the monitoring system control unit 610 using various local wireless protocols such as wifi, Bluetooth, zwave, zigbee, HomePlug (ethernet over powerline), or wired protocols such as Ethernet and USB, to connect the one or more user devices 640, 650 to local security and automation equipment. The one or more user devices 640, 650 may connect locally to the monitoring system and its sensors and other devices. The local connection may improve the speed of status and control communications because communicating through the network 605 with a remote server (e.g., the monitoring application server 660) may be significantly slower.

Although the one or more user devices 640, 650 are shown as communicating with the monitoring system control unit 610, the one or more user devices 640, 650 may communicate directly with the sensors and other devices controlled by the monitoring system control unit 610. In some implementations, the one or more user devices 640, 650 replace the monitoring system control unit 610 and perform the functions of the monitoring system control unit 610 for local monitoring and long range/offsite communication.

In other implementations, the one or more user devices 640, 650 receive monitoring system data captured by the monitoring system control unit 610 through the network 605. The one or more user devices 640, 650 may receive the data from the monitoring system control unit 610 through the network 605 or the monitoring application server 660 may relay data received from the monitoring system control unit 610 to the one or more user devices 640, 650 through the network 605. In this regard, the monitoring application server 660 may facilitate communication between the one or more user devices 640, 650 and the monitoring system.

In some implementations, the one or more user devices 640, 650 may be configured to switch whether the one or more user devices 640, 650 communicate with the monitoring system control unit 610 directly (e.g., through link 638) or through the monitoring application server 660 (e.g., through network 605) based on a location of the one or more user devices 640, 650. For instance, when the one or more user devices 640, 650 are located close to the monitoring system control unit 610 and in range to communicate directly with the monitoring system control unit 610, the one or more user devices 640, 650 use direct communication. When the one or more user devices 640, 650 are located far from the monitoring system control unit 610 and not in range to communicate directly with the monitoring system control unit 210, the one or more user devices 640, 650 use communication through the monitoring application server 660.

Although the one or more user devices 640, 650 are shown as being connected to the network 605, in some implementations, the one or more user devices 640, 650 are not connected to the network 605. In these implementations, the one or more user devices 640, 650 communicate directly with one or more of the monitoring system components and no network (e.g., Internet) connection or reliance on remote servers is needed.

In some implementations, the one or more user devices 640, 650 are used in conjunction with only local sensors and/or local devices in a house. In these implementations, the system 600 only includes the one or more user devices 640, 650, the sensors 620, the module 622, the camera 630, and the robotic devices 680 and 682. The one or more user devices 640, 650 receive data directly from the sensors 620, the module 622, the camera 630, and the robotic devices 680 and 682 and sends data directly to the sensors 620, the module 622, the camera 630, and the robotic devices 680 and 682.

In other implementations, the system 600 further includes network 605 and the sensors 620, the module 622, the camera 630, the thermostat 634, and the robotic devices 680 and 682 are configured to communicate sensor and image data to the one or more user devices 640, 650 over network 605 (e.g., the Internet, cellular network, etc.). In yet another implementation, the sensors 620, the module 622, the camera 630, the thermostat 634, and the robotic devices 680 and 682 (or a component, such as a bridge/router) are intelligent enough to change the communication pathway from a direct local pathway when the one or more user devices 640, 650 are in close physical proximity to the sensors 620, the module 622, the camera 630, the thermostat 634, and the robotic devices 680 and 682 to a pathway over network 605 when the one or more user devices 640, 650 are farther from the sensors 620, the module 622, the camera 630, the thermostat 634, and the robotic devices 680 and 682. In some examples, the system leverages GPS information from the one or more user devices 640, 650 to determine whether the one or more user devices 640, 650 are close enough to the sensors 620, the module 622, the camera 630, the thermostat 634, and the robotic devices 680 and 682 to use the direct local pathway or whether the one or more user devices 640, 650 are far enough from the sensors 620, the module 622, the camera 630, the thermostat 634, and the robotic devices 680 and 682 that the pathway over network 605 is required. In other examples, the system leverages status communications (e.g., pinging) between the one or more user devices 640, 650 and the sensors 620, the module 622, the camera 630, the thermostat 634, and the robotic devices 680 and 682 to determine whether communication using the direct local pathway is possible. If communication using the direct local pathway is possible, the one or more user devices 640, 650 communicate with the sensors 620, the module 622, the camera 630, the thermostat 634, and the robotic devices 680 and 682 using the direct local pathway. If communication using the direct local pathway is not possible, the one or more user devices 640, 650 communicate with the sensors 620, the module 622, the camera 630, the thermostat 634, and the robotic devices 680 and 682 using the pathway over network 605.

In some implementations, the system 600 provides end users with access to images captured by the camera 630 to aid in decision making. For example, the system 600 may provide an image, video, or the like of a room in the property that has a light left on. The light left on may be detected based on the readings of one or more light sensors, one or more motion sensors, other similar sensors, or a combination thereof, that are located throughout a property. The system 600 may transmit the images captured by the camera 630 over a wireless WAN network to the user devices 640, 650. Because transmission over a wireless WAN network may be relatively expensive, the system 200 uses several techniques to reduce costs while providing access to significant levels of useful visual information. In response to receipt of data that indicates one or more lights were left on in a property, a user of the user device 640, 650 may input an instruction for one or more robotic device to turn off the light. One or more robotic devices 680 and 682 may (i) receive the instruction directly from the user device 640, 650 or indirectly after the instruction is received by, and forwarded from, a monitoring system control unit 610, (ii) access a stored map that provides the location of the manual control associated with the light, (iii) navigate to the manual control associated with the light, (iv) deploy a mechanical arm, and (v) use the mechanical arm to manipulate the manual control associated with the light to turn off the light.

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "Away" state, but set not to capture images when the alarm system is armed in a "Stay" state or disarmed. In addition, the camera 630 may be triggered to begin capturing images when the alarm system detects an event, such as an alarm event, a door opening event for a door that leads to an area within a field of view of the camera 630, or motion in the area within the field of view of the camera 630. In other implementations, the camera 630 may capture images continuously, but the captured images may be stored or transmitted over a network when needed.

Further, in some implementations, the system 600 intelligently leverages the robotic devices 680 and 682 to aid in security monitoring, property automation, and property management. For example, the robotic devices 680 and 682 may aid in investigating alarm events detected at the property by the monitoring system control unit 610. In this example, the monitoring system control unit 610 may detect an event (e.g., a light left on, a burner left on, a faucet left on, a garage door left open, or the like) and, based on the detected event, control the robotic devices 680 and 682 to attempt to capture still images, video, or the like that can be provided to a user device 640, 650. Each of the robotic devices 680 and 682 may execute a predefined navigation pattern within the property or the robotic devices 680 and 682 based on a stored map of the property. The map may have been previously generated by using one or more robotic devices 680 and 682 to execute a coordinated scan of the property in which the robotic devices 680 and 682 exchange location information and navigate to areas that have not been explored by one of the other devices.

In some examples, the robotic devices 680 and 682 may be assigned to different areas of the property where the robotic devices 680 and 682 can move in an unobstructed manner. In these examples, the robotic devices 680 and 682 may be assigned to different levels in a property (e.g., an upstairs robotic device and a downstairs robotic device) and even different rooms or sections that are potentially blocked by doors. The monitoring system control unit 610 coordinate tracking movement based on the assigned areas. For instance, the monitoring system control unit 610 determines areas in a property where an event has been detected and only controls the robotic devices assigned to the determined areas to operate.

In addition, the robotic devices 680 and 682 may be assigned as interior and exterior devices. The interior devices may navigate throughout an interior of the property. The exterior devices may navigate about an exterior periphery of the property. The exterior devices may be weather conditioned to remain outdoors (e.g., in an outdoor enclosure) at all times such that the exterior devices can explore an exterior of the property at any suitable time. In addition, the exterior devices may remain inside the property and the monitoring system control unit 610 may open a door to enable an exterior robotic device to leave and return to the property. For instance, an exterior device may have a base or reference location in a garage of the property and the monitoring system control unit 610 may automatically open a garage door to allow the exterior device to leave the garage and explore the exterior of the property.

In some implementations, the monitoring system control unit 610 may monitor operational status of the robotic devices 680 and 682 and coordinate further operation based on the operational status. In these implementations, the monitoring system control unit 610 may detect that a particular robotic device is no longer operational and control one or more other robotic devices to perform operations originally assigned to the non-operational robotic device.

In some implementations, the monitoring system control unit 610 may determine battery power available for each of the robotic devices 680 and 682 and coordinate operation of the robotic devices 680 and 682 based on available battery power. In these implementations, the robotic devices 680 and 682 may report battery power remaining to the monitoring system control unit 610 and the monitoring system control unit 610 may determine a subset of the robotic devices 680 and 682 to deploy based on the battery power information. For instance, the monitoring system control unit 610 may select to initially deploy the robotic device with the most available battery power to allow the other robotic devices to charge while the selected device assists with monitoring. Once the battery power for the selected device falls below a threshold, the monitoring system control unit 610 may return the selected device to a docking station and select the robotic device with the presently highest available battery power to resume the monitoring options being performed. The monitoring system control unit 610 may cycle through all of the robotic devices 680 and 682 in an intelligent manner that best leverages the battery power available. If the battery power of a device becomes too low to effectively operate as a navigating device, the monitoring system control unit 610 may control the robotic device to remain stationary and act as a stationary camera or other sensor to still assist with monitoring, although the added benefit of navigation no longer exists.

In some implementations, the system 600 allows central station operators, first responders, and/or users of the property to interact with and control the robotic devices 680 and 682. In these implementations, a central station operator, first responder, or user of the property may provide input to control the robotic devices 680 and 682 in a manner that best assists with monitoring and investigation of detected events. For instance, the central station operator, first responder, or user of the property may remotely control navigation of the robotic devices 680 and 682. The central station operator, first responder, or user of the property also may provide general commands related to actions the robotic devices 680 and 682 are designed to take. Alternatively, or in addition, a central station operator, first responder, or user of the property may take control of the robotic devices 680 and 682. For example, a user may use a user device 640, 650 to direct navigation of the robotic devices 680 and 682, remotely control the robotic device's 680 and 682 mechanical arm, or the like. Such control may be beneficial in instances where the robotic devices 680 and 682 encounter a problem in manipulating a manual control.

In some examples, the robotic devices 680 and 682 may periodically perform test sequences to ensure the robotic devices 680 and 682 will operate correctly if needed. In these examples, the robotic devices 680 and 682 may periodically navigate predefined navigation patterns used to investigate the property and/or may navigate around the property in a scanning sequence. The robotic devices 680 and 682 may determine whether the test sequences perform correctly or whether an error occurs that prevents full investigation of the property. To the extent an error occurs, the robotic devices 680 and 682 report the error and enable a user of the property or a technician to correct the error prior to a time when the robotic devices 680 and 682 would be needed for safety monitoring. For example, the monitoring system control unit 610 may periodically instruct a robotic devices 680 and 682 to navigate to a particular manual control and manipulate the manual control.

The monitoring system control unit 610 also may arrange the test sequences to occur during periods of time that are convenient for users of the property. For example, the monitoring system control unit 610 may assess sensor data at the property and determine a time period in which the property is unoccupied and unlikely to be occupied until the test sequences complete. In this example, the monitoring system control unit 610 waits until the preferred time period to initiate test sequences for one or more of the robotic devices 680 and 682.

In some implementations, the robotic devices 680 and 682 may operate as mobile sensors that move throughout the property. In these implementations, the robotic devices 680 and 682 may have temperature sensors that can be used as inputs to a thermostat at the property. In this regard, the robotic devices 680 and 682 may navigate throughout the property and take temperature measurements at various locations in the property. With the temperatures at various locations, the system 600 may identify hot and/or cold spots in the property and adjust thermostat operation accordingly. For instance, the robotic devices 680 and 682 may be deployed to take temperature measurements in areas of the property where people are located and the thermostat may be adjusted to improve the temperature in the location where people are actually located in the property.

In some examples, the robotic devices 680 and 682 may have humidity and air flow sensors in addition to temperature sensors. In these examples, the robotic devices 680 and 682 may periodically navigate throughout the property and take temperature, humidity, and air flow measurements at various locations throughout the property. The system 600 may use the temperature, humidity, and air flow measurements to detect inefficient areas of the property. The inefficiencies may be used to detect areas where insulation in the property in deficient (e.g., new siding, windows, and/or doors may be useful in certain areas) and/or where leaks exist in the property. The property efficiency information may be provided to a user of the property to enable the user to improve efficiency in the property.

The invention claimed is:

1. A method for returning a drone to a drone dock, the method comprising:
    storing, by the drone, information that describes a power based on at least one of a light beam pattern or a device identifier of a first visible light communication device coupled to the drone dock;
    storing, by the drone, information that describes a power based on at least one of a light beam pattern or a device identifier of a second visible light communication device coupled to the drone dock;
    obtaining, by the drone, data indicating a first navigation path that specifies a first set of alignment parameters for engaging the drone dock;
    detecting, by the drone and using a drone-mounted light detection unit, a light signal generated by the first visible light communication device coupled to the drone dock;
    accessing, by the drone, the information that describes the power based on at least one of the light beam pattern or the device identifier of the first visible light communication device coupled to the drone dock and the information that describes the power based on at least one of the light beam pattern or the device identifier of the second visible light communication device coupled to the drone dock;
    determining, by the drone and based on (i) the power based on at least one of the light beam pattern or the device identifier of the first visible light communication device coupled to the drone dock and (ii) the power based on at least one of the light beam pattern or the device identifier of the second visible light communication device coupled to the drone dock, a relative signal strength of the light beam and that the light signal that was detected was generated by the first visible light communication device coupled to the drone dock instead of the second visible light communication device;
    determining, by the drone, a relative distance between the drone and the first visible light communication device coupled to the drone dock based on the relative signal strength;
    determining, by the drone, to adjust the first navigation path based on the relative distance between the drone and the first visible light communication device coupled to the drone dock;
    based on determining to adjust the first navigation path, generating, by the drone, a second navigation path that specifies a second set of alignment parameters for engaging the drone dock, wherein at least one alignment parameter included in the second set of alignment parameters is not included in the first set of alignment parameters; and
    navigating, by the drone, to the drone dock based on the second navigation path.

2. The method of claim 1, wherein the drone-mounted light detection unit includes an array of photodiodes.

3. The method of claim 1, wherein determining, by the drone and based on (i) the power based on at least one of the light beam pattern or the device identifier of the first visible light communication device coupled to the drone dock and (ii) the power based on at least one of the light beam pattern or the device identifier of the second visible light communication device coupled to the drone dock, a relative signal strength of the light beam and that the light signal that was detected was generated by the first visible light communication device coupled to the drone dock instead of the second visible light communication device comprises:
    comparing, by the drone, attributes of the light signal that was detected to the information that describes the power based on at least one of the light beam pattern or the device identifier of the first visible light communication device coupled to the drone dock; and
    determining, based on the comparison and by the drone, that the first visible light communication device generated the light signal.

4. The method of claim 3, wherein:
the drone and the drone dock are each located within a property; and
the method further comprises:
    determining, by the drone, a current location in a three-dimensional map of the property, wherein:
        the current location is determined based on a relative comparison of a location of the drone within the property and a location of the first visible light communication device within the property, and
        the first visible light communication device is mounted to the drone dock; and
    generating, by the drone, a second navigation path comprises:
        adjusting, by the drone, the first navigation path based on the current location.

5. The method of claim 1, further comprising:
obtaining, by the drone, a second light signal generated by the second visible light communication device; and
determining, by the drone, (i) a first angle of incidence between the light signal detected by the first visible light communication device and a first plane that is perpendicular to the drone-mounted light detection unit at a first point where the light signal culminates on the drone-mounted light detection unit, and (ii) a second angle of incidence between the second light signal detected by the second visible light communication device and a second plane that is perpendicular to the drone-mounted light detection unit at a second point where the second light signal culminates on the drone-mounted light detection unit.

6. The method of claim 5, wherein:
the drone and the drone dock are each located in a property;
determining the position comprises:
  determining, by the drone, a current location in a three-dimensional map of the property based on the first angle of incidence and the second angle of incidence, wherein the current location is determined relative to a location of the drone dock within the three-dimensional map; and
generating a second navigation path comprises:
  adjusting, by the drone, the first navigation path based on the current location.

7. The method of claim 6, wherein determining, by the drone, a current location in a three-dimensional map of the property comprises:
determining the location using temporal changes in the first angle of incidence and the second angle of incidence.

8. A drone comprising:
one or more processors; and
one or more storage devices, wherein the storage devices include a plurality of instructions that, when executed by the one or more processors, cause the drone to perform operations, the operations comprising:
  storing, by the drone, information that describes a power based on at least one of a light beam pattern or a device identifier of a first visible light communication device coupled to the drone dock;
  storing, by the drone, information that describes a power based on at least one of a light beam pattern or a device identifier of a second visible light communication device coupled to the drone dock;
  obtaining, by the drone, data indicating a first navigation path that specifies a first set of alignment parameters for engaging the drone dock;
  detecting, by the drone and using a drone-mounted light detection unit, a light signal generated by the first visible light communication device coupled to the drone dock;
  accessing, by the drone, the information that describes the power based on at least one of the light beam pattern or the device identifier of the first visible light communication device coupled to the drone dock and the information that describes the power based on at least one of the light beam pattern or the device identifier of the second visible light communication device coupled to the drone dock;
  determining, by the drone and based on (i) the power based on at least one of the light beam pattern or the device identifier of the first visible light communication device coupled to the drone dock and (ii) the power based on at least one of the light beam pattern or the device identifier of the second visible light communication device coupled to the drone dock, a relative signal strength of the light beam and that the light signal that was detected was generated by the first visible light communication device coupled to the drone dock instead of the second visible light communication device;
  determining, by the drone, a relative distance between the drone and the first visible light communication device coupled to the drone dock based on the relative signal strength;
  determining, by the drone, to adjust the first navigation path based on the relative distance between the drone and the first visible light communication device coupled to the drone dock;
  based on determining to adjust the first navigation path, generating, by the drone, a second navigation path that specifies a second set of alignment parameters for engaging the drone dock, wherein at least one alignment parameter included in the second set of alignment parameters is not included in the first set of alignment parameters; and
  navigating, by the drone, to the drone dock based on the second navigation path.

9. The drone of claim 8, wherein the drone-mounted light detection unit includes an array of photodiodes.

10. The drone of claim 8, wherein determining, by the drone and based on (i) the power based on at least one of the light beam pattern or the device identifier of the first visible light communication device coupled to the drone dock and (ii) the power based on at least one of the light beam pattern or the device identifier of the second visible light communication device coupled to the drone dock, a relative signal strength of the light beam and that the light signal that was detected was generated by the first visible light communication device coupled to the drone dock instead of the second visible light communication device comprises:
  comparing, by the drone, attributes of the light signal that was detected to the information that describes the power based on at least one of the light beam pattern or the device identifier of the first visible light communication device coupled to the drone dock; and
  determining, based on the comparison and by the drone, that the first visible light communication device generated the light signal.

11. The drone of claim 10, wherein:
the drone and the drone dock are each located within a property; and
the operations further comprise:
  determining, by the drone, a current location of the drone in a three-dimensional map of the property, wherein:
    the current location is determined based on a relative comparison of a location of the drone within the property and a location of the first visible light communication device within the property, and
    the first visible light communication device is mounted to the drone dock; and
  generating, by the drone, a second navigation path comprises:
    adjusting, by the drone, the first navigation path based on the current location.

12. The drone of claim 8, the operations further comprising:
  obtaining, by the drone, a second light signal generated by the second visible light communication device; and
  determining, by the drone, (i) a first angle of incidence between the light signal detected by the first visible light communication device and a first plane that is perpendicular to the drone-mounted light detection unit at a first point where the light signal culminates on the drone-mounted light detection unit, and (ii) a second angle of incidence between the second light signal detected by the second visible light communication device and a second plane that is perpendicular to the drone-mounted light detection unit at a second point where the second light signal culminates on the drone-mounted light detection unit.

13. The drone of claim 12, wherein:
the drone and the drone dock are each located in a property; and
determining the position comprises:
 determining, by the drone, a current location in a three-dimensional map of the property based on the first angle of incidence and the second angle of incidence, wherein the current location is determined relative to a location of the drone dock within the three-dimensional map; and
generating a second navigation path comprises:
 adjusting, by the drone, the first navigation path based on the current location.

14. The drone of claim 13, wherein determining, by the drone, a current location in a three-dimensional map of the property comprises:
determining the location using temporal changes in the first angle of incidence and the second angle of incidence.

15. A non-transitory computer-readable medium storing software comprising instructions executable by one or more computers which, upon such execution, cause the one or more computers to perform operations comprising:
storing, by a drone, information that describes a power based on at least one of a light beam pattern or a device identifier of a first visible light communication device coupled to the drone dock;
storing, by the drone, information that describes a power based on at least one of a light beam pattern or a device identifier of a second visible light communication device coupled to the drone dock;
obtaining, by the drone, data indicating a first navigation path that specifies a first set of alignment parameters for engaging the drone dock;
detecting, by the drone and using a drone-mounted light detection unit, a light signal generated by the first visible light communication device coupled to the drone dock;
accessing, by the drone, the information that describes the power based on at least one of the light beam pattern or the device identifier of the first visible light communication device coupled to the drone dock and the information that describes the power based on at least one of the light beam pattern or the device identifier of the second visible light communication device coupled to the drone dock;
determining, by the drone and based on (i) the power based on at least one of the light beam pattern or the device identifier of the first visible light communication device coupled to the drone dock and (ii) the power based on at least one of the light beam pattern or the device identifier of the second visible light communication device coupled to the drone dock, a relative signal strength of the light beam and that the light signal that was detected was generated by the first visible light communication device coupled to the drone dock instead of the second visible light communication device;
determining, by the drone, a relative distance between the drone and the first visible light communication device coupled to the drone dock based on the relative signal strength;

determining, by the drone, to adjust the first navigation path based on the relative distance between the drone and the first visible light communication device coupled to the drone dock;
based on determining to adjust the first navigation path, generating, by the drone, a second navigation path that specifies a second set of alignment parameters for engaging the drone dock, wherein at least one alignment parameter included in the second set of alignment parameters is not included in the first set of alignment parameters; and
navigating, by the drone, to the drone dock based on the second navigation path.

16. The medium of claim 15, wherein the drone-mounted light detection unit includes an array of photodiodes.

17. The medium of claim 15, wherein determining, by the drone and based on (i) the power based on at least one of the light beam pattern or the device identifier of the first visible light communication device coupled to the drone dock and (ii) the power based on at least one of the light beam pattern or the device identifier of the second visible light communication device coupled to the drone dock, a relative signal strength of the light beam and that the light signal that was detected was generated by the first visible light communication device coupled to the drone dock instead of the second visible light communication device comprises:
comparing, by the drone, attributes of the light signal that was detected to the information that describes the power based on at least one of the light beam pattern or the device identifier of the first visible light communication device coupled to the drone dock; and
determining, based on the comparison and by the drone, that the first visible light communication device generated the light signal.

18. The medium of claim 17, wherein:
the drone and the drone dock are each located within a property; and
the operations further comprise:
 determining, by the drone, a current location in a three-dimensional map of the property, wherein:
  the current location is determined based on a relative comparison of a location of the drone within the property and a location of the first visible light communication device within the property, and
  the first visible light communication device is mounted to the drone dock; and
generating, by the drone, a second navigation path comprises:
 adjusting, by the drone, the first navigation path based on the current location.

19. The medium of claim 15, the operations further comprising:
obtaining, by the drone, a second light signal generated by the second visible light communication device; and
determining, by the drone, (i) a first angle of incidence between the light signal detected by the first visible light communication device and a first plane that is perpendicular to the drone-mounted light detection unit at a first point where the light signal culminates on the drone-mounted light detection unit, and (ii) a second angle of incidence between the second light signal detected by the second visible light communication device and a second plane that is perpendicular to the drone-mounted light detection unit at a second point where the second light signal culminates on the drone-mounted light detection unit.

20. The medium of claim 19, wherein:
the drone and the drone dock are each located in a property;
determining the position comprises:
  determining, by the drone, a current location in a three-dimensional map of the property based on the first angle of incidence and the second angle of incidence, wherein the current location is determined relative to a location of the drone dock within the three-dimensional map; and
generating a second navigation path comprises:
  adjusting, by the drone, the first navigation path based on the current location.

* * * * *